(12) United States Patent
Kamezawa et al.

(10) Patent No.: US 11,693,442 B2
(45) Date of Patent: Jul. 4, 2023

(54) CONSTANT VOLTAGE DC SUPPLY DEVICE

(71) Applicants: Yoshio Takimoto, Ikoma (JP); Akihiko Tanaka, Saitama (JP)

(72) Inventors: Takashi Kamezawa, Saitama (JP); Akihiko Tanaka, Saitama (JP); Masaki Sakaguchi, Koube (JP)

(73) Assignees: Takashi Kamezawa, Saitama (JP); Yoshio Takimoto, Ikoma (JP); Akihiko Tanaka, Saitama (JP)

( * ) Notice: Subject to any disclaimer, the term of this patent is extended or adjusted under 35 U.S.C. 154(b) by 294 days.

(21) Appl. No.: 16/979,142

(22) PCT Filed: Feb. 26, 2019

(86) PCT No.: PCT/JP2019/007274
§ 371 (c)(1),
(2) Date: Sep. 8, 2020

(87) PCT Pub. No.: WO2019/176526
PCT Pub. Date: Sep. 19, 2019

(65) Prior Publication Data
US 2020/0401175 A1 Dec. 24, 2020

(30) Foreign Application Priority Data
Mar. 12, 2018 (JP) ................. 2018-044698

(51) Int. Cl.
*G05F 1/577* (2006.01)
*H02J 7/34* (2006.01)
*H02J 7/35* (2006.01)
(52) U.S. Cl.
CPC ............. *G05F 1/577* (2013.01); *H02J 7/34* (2013.01); *H02J 7/342* (2020.01); *H02J 7/35* (2013.01)

(58) Field of Classification Search
CPC ... G05F 1/577; H02J 7/342; H02J 7/34; H02J 7/35
See application file for complete search history.

(56) References Cited

U.S. PATENT DOCUMENTS

2011/0101909 A1    5/2011    Bowman

FOREIGN PATENT DOCUMENTS

JP    2012525117 A    10/2012
JP    2012244900 A    12/2012
(Continued)

OTHER PUBLICATIONS

ISA Japan Patent Office, International Search Report Issued in Application No. PCT/JP2019/007274, dated May 21, 2019, WIPO, 4 pages.

*Primary Examiner* — Robert L Deberadinis
(74) *Attorney, Agent, or Firm* — McCoy Russell LLP

(57) ABSTRACT

To provide a constant voltage DC supply device capable of supplying a direct current at a predetermined voltage for a long time irrespective of characteristics of a storage battery and the like. The constant voltage DC supply device for supplying a direct current at a predetermined voltage from a specific power generation unit, including: a plurality of power storage units 10*a*, 10*b*; a drive units 30 that is connected to the power storage units and rotating/driving by power supplied from any one of the power storage units; a plurality of the power generation units 40*a*, 40*b* connected to the drive units, respectively, and generating power by driving of the drive units; and a control unit 30 for controlling connection between the plurality of power storage units and the driving unit and between the power generation units other than the specific power generation unit 40*b* and the power storage units 40*a*, in which wherein the control unit executes control such that, when a voltage of the power storage unit supplying the power to the drive unit falls to a
(Continued)

first voltage or less, the power is supplied from the power storage unit other than power storage part and to charge at least one power storage part other than that power storage unit is charged.

7 Claims, 4 Drawing Sheets

(56) References Cited

FOREIGN PATENT DOCUMENTS

| | | | |
|---|---|---|---|
| JP | 2013095182 A | 5/2013 |
| JP | 2013153578 A | 8/2013 |
| JP | 2014096940 A | 5/2014 |
| JP | 2016190630 A | 11/2016 |
| WO | 2015194231 A1 | 12/2015 |

CONSTANT VOLTAGE DC SUPPLY DEVICE

CROSS-REFERENCE TO RELATED APPLICATIONS

The present application is a U.S. National Phase of International Patent Application Serial No. PCT/JP2019/007274 entitled "CONSTANT VOLTAGE DC SUPPLY DEVICE," filed on Feb. 26, 2019. International Patent Application Serial No. PCT/JP2019/007274 claims priority to Japanese Patent Application No. 2018-044698 filed on Mar. 12, 2018. The entire contents of each of the above-referenced applications are hereby incorporated by reference for all purposes.

TECHNICAL FIELD

The present invention relates to a device for supplying a direct current at a constant voltage.

BACKGROUND AND SUMMARY

In order to drive a motor mounted on an electric vehicle and the like, a relatively high voltage needs to be applied. Thus, a constant voltage DC supply device in which a plurality of batteries is combined in series/parallel is used in general.

Moreover, other than the above, a DC constant voltage output device and the like including a constant voltage circuit has been conventionally known (see Patent Literature 1, for example).

PRIOR ART DOCUMENTS

Patent Documents

Patent Literature 1: Japanese Patent Laid-Open No. 2013-153578

Technical Problem

However, the conventional constant voltage DC supply device needs to use a constant voltage circuit and the like and has a problem that it cannot be easily used for the one with a limited space such as an automobile and needs to be configured by combining a plurality of batteries in series/parallel in order to supply a direct current at a relatively high voltage for a long time and thus, it has a problem of an increased weight. In addition, the conventional constant voltage DC supply device needs to be configured by combining a large number of batteries in series/parallel and thus, it has a problem that safety can be lowered.

Moreover, since the conventional constant voltage DC supply device needs a constant voltage circuit and the like, it has a problem that a DC constant voltage output device becomes expensive.

Furthermore, the conventional constant voltage DC supply device has a problem that, if discharge is performed to a certain degree due to characteristics of a connected battery or the like, a predetermined voltage cannot be output even if a constant voltage circuit or the like is used.

The present invention was made in view of the aforementioned circumstances and has an object to provide a constant voltage DC supply device capable of supplying a direct current at a predetermined voltage for a long time irrespective of characteristics of a storage battery and the like.

Solution to Problem

The inventor of the present invention found an unprecedented constant voltage DC supply device as below as the result of keen study/development concerning the aforementioned problems.

A first aspect of the present invention for solving the aforementioned problems is a constant voltage DC supply device for supplying a direct current at a predetermined voltage from a specific power generation unit, including a plurality of power storage units, a drive unit connected to the plurality of power storage units and rotating/driving by power supplied from any one of the power storage units, a plurality of the power generation units connected to the drive units, respectively, and generating power by driving of the drive units, and a control unit for controlling connection between the plurality of power storage units and the driving unit and between the power generation units other than the specific power generation unit and the power storage units, in which the control unit executes control such that, when a voltage of the power storage unit supplying the power to the drive unit falls to a first voltage or less, the power is supplied from the power storage unit other than that power storage unit and that at least one power storage unit other than that power storage unit is charged.

In the first aspect as above, the direct current at the predetermined voltage can be supplied for a long time irrespective of the characteristics of the power storage unit such as the storage battery or the like. Moreover, the constant voltage DC supply device of this aspect can keep a quantity of the batteries or the like used for the power storage units lower than that of the conventional constant voltage DC supply device and thus, it becomes a light-weighted and compact one as compared with the conventional constant voltage DC supply device. As a result, the constant voltage DC supply device in this aspect becomes safer than the conventional constant voltage DC supply device.

A second aspect of the present invention is the constant voltage DC supply device described in the first aspect, characterized by being composed of the drive unit and the power generation unit, capable of charging such that a voltage of the power storage unit to be charged becomes the first voltage or more before the voltage of the power storage unit supplying the power to the drive unit falls below the first voltage.

In the second aspect as above, since charging can be made so that the voltage of the power storage unit to be charged becomes the first voltage or more before the voltage of the power storage unit supplying the power to the drive unit falls below the first voltage, the direct current at the predetermined voltage can be supplied for a longer time.

A third aspect of the present invention is the constant voltage DC supply device described in the first or second aspect, characterized in that at least one of the power generation units is connected to the drive unit through a converter which converts a torque of the drive unit.

In the third aspect as above, since the torque for driving a generator can be changed by the converter, the direct current at various voltages can be supplied for a long time.

A fourth aspect of the present invention is the constant voltage DC supply device described in any one of the first to third aspects, characterized in that the control unit executes control such that, when the voltage of the power storage unit being charged becomes a second voltage higher than the first voltage or more, the power storage unit other than the power storage unit and other than the power storage unit supplying the power is charged or charging to the power storage unit is stopped.

In the fourth aspect as above, overcharging to the power storage unit can be prevented.

A fifth aspect of the present invention is the constant voltage DC supply device described in any one of the first to fourth aspects, characterized in that at least a part of the power storage unit is covered with a heat insulating material.

In the fifth aspect as above, the direct current at the predetermined voltage can be supplied for a long time irrespective of the characteristics of the power storage unit such as the storage battery even under an environment at 50° C. or more or at −20° C. or less.

A sixth aspect of the present invention is the constant voltage DC supply device described in any one of the first to fourth aspects, characterized in that the predetermined voltage is 40 V or more.

In the sixth aspect as above, the light-weighted and compact constant voltage DC supply device which can be applied to an electric vehicle or the like to which the conventional constant voltage DC supply device which has a large volume and is heavy cannot be applied.

DETAILED DESCRIPTION

Embodiments of a constant voltage DC supply device according to the present invention will be described below by referring to the attached drawings. Note that the present invention is not limited to the following embodiments.

Embodiment 1

Figure 1:
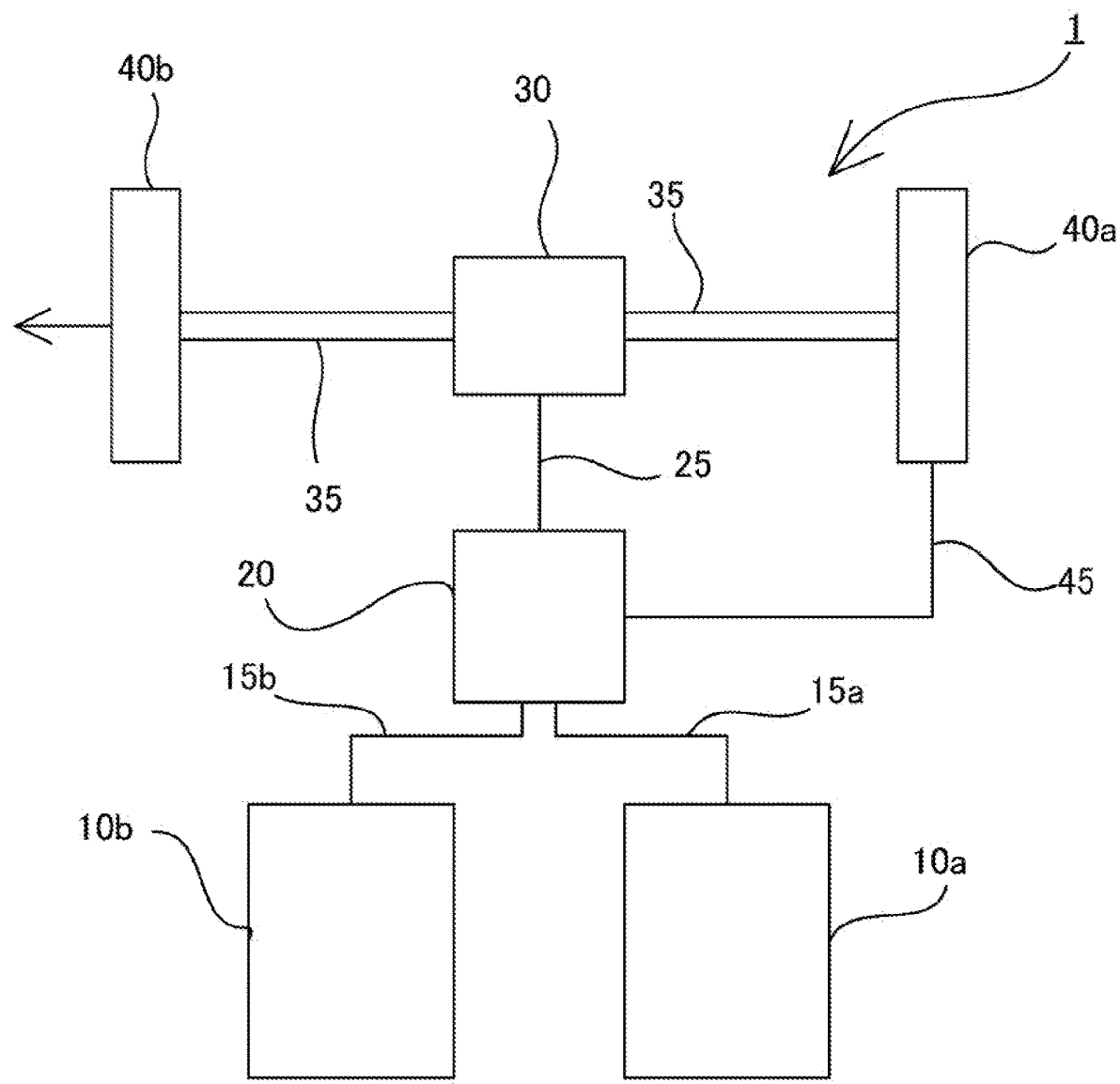
FIG. 1 is an outline configuration diagram of a constant voltage DC supply device according to an embodiment 1.

FIG. 1 is an outline diagram of the constant voltage DC supply device according to this embodiment. As illustrated in FIG. 1, the constant voltage DC supply device 1 according to this embodiment is composed of two power storage units 10a and 10b, a control unit 20 connected to them through wirings 15a and 15b, respectively, a drive unit 30 connected to the control unit 20 through a wiring 25, and two power generation units 40a and 40b connected to both sides of the drive unit 30 through a shaft 35 for transmitting a driving force of the drive unit 30, respectively, and the one power generation unit 40a is connected to the control unit 20 through the wiring 45. In this embodiment, the power generation unit 40b is the specific power generation unit.

The constant voltage DC supply device 1 configured as above drives the drive unit 30 with a predetermined driving force by power supplied from either one of the power storage units 10a and 10b by the control unit 20. As a result, each of the power generation units 40a and 40b generates power. Here, since the drive unit 30 is driven by a predetermined driving force, power at a predetermined voltage and a predetermined current is generated from each of the power generation units 40a and 40b and is supplied.

And the power generated by the power generation unit 40a is supplied by the control unit 20 to the power storage unit not supplying the power to the drive unit 30 and charges that power storage unit. On the other hand, with regard to the power generated by the power generation unit 40b, the power at a predetermined voltage and the predetermined current is generated and supplied to the outside.

Here, the power storage units 10a and 10b are not particularly limited as long as they can discharge/charge electricity. As the power storage units 10a and 10b, a lead storage battery, a lithium ion battery, a capacitor (including an electric double-layer capacitor) and the like are cited, for example. Among them, the lithium ion battery or the electric double-layer capacitor which has no memory effect and does not cause a problem even if it is charged in a state where it is not completely discharged is preferable.

The control unit 20 is not particularly limited as long as it can measure a voltage of each of the power storage units 10a and 10b and can control charging/discharging according to the voltage of each of the power storage units 10a and 10b. As the control unit 20, a microcomputer and the like including a voltage sensor and having a function as above are cited.

The drive unit 30 is not particularly limited as long as it is capable of driving with the power supplied from either one of the power storage units 10a and 10b. As the drive unit 30, a commercial motor and the like are cited, for example.

The power generation units 40a and 40b are not particularly limited, either, as long as it can generate an electric current at a predetermined voltage by using the driving force of the drive unit 30, and the voltage/current which can be generated by each of the power generation units may be the same or may be different. As the power generation units 40a and 40b, a commercial generator and the like are cited, for example.

The wirings 15a, 15b, 25, and 45 are not particularly limited as long as they can allow the current supplied from each configuration to flow, and a commercial wiring and the like can be used. Moreover, the shaft 35 is not particularly limited as long as it can transmit the driving force of the drive unit 30 to the power generation units 40a and 40b, and a commercial shaft and the like can be used.

Here, the predetermined voltage is not particularly limited, but 40 V or more is preferable since it can be applied to an electric vehicle and the like to which the conventional constant voltage DC supply device which has a large volume and is heavy cannot be applied, 50 V or more is more preferable, 70 V or more is further preferable, and 100 V or more is particularly preferable.

Figure 2:
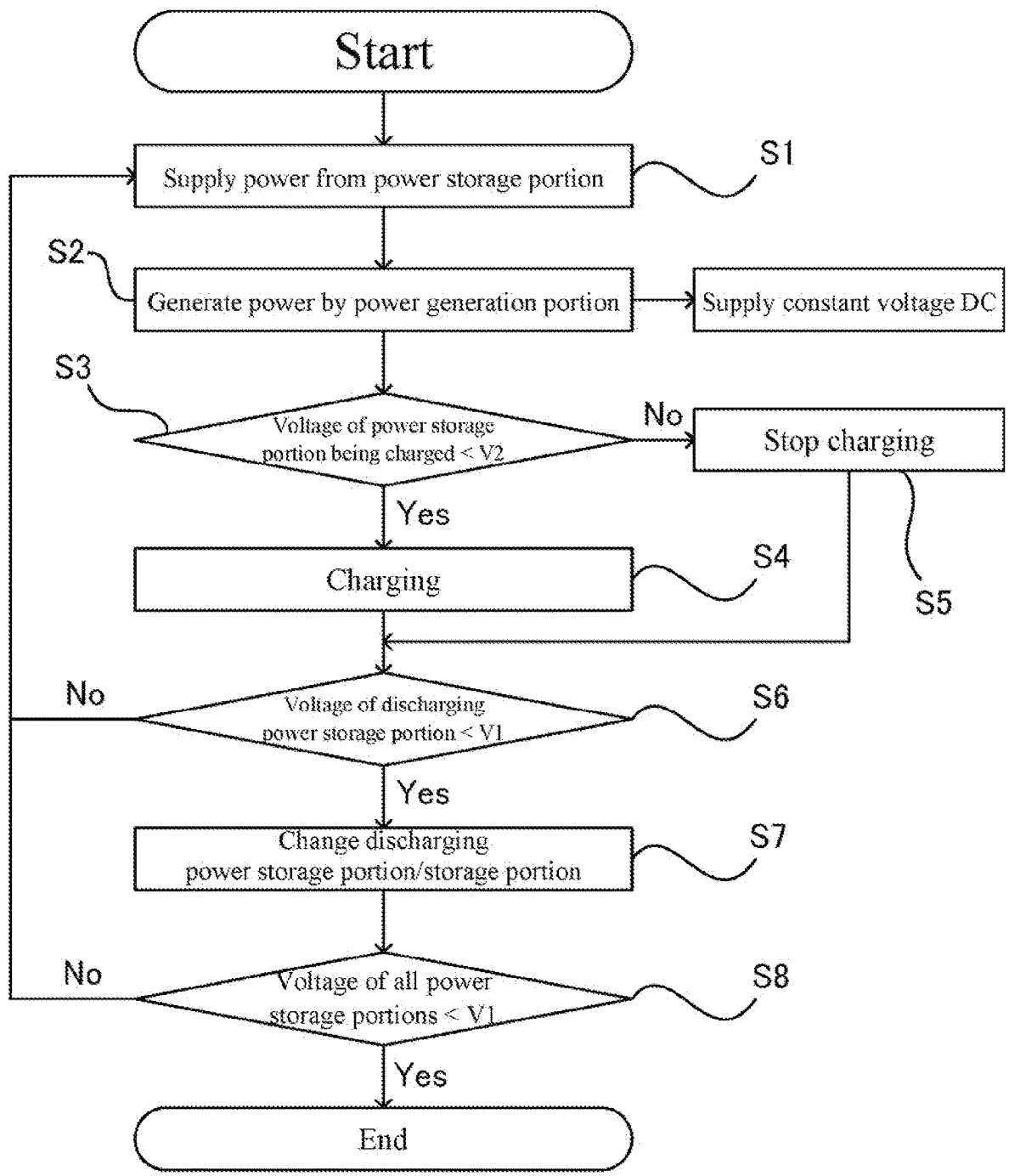
FIG. 2 is a flowchart illustrating an operation of the constant voltage DC supply device according to the embodiment 1.

Subsequently, an operation of the constant voltage DC supply device 1 will be described. FIG. 2 is a flowchart illustrating the operation of the constant voltage DC supply device 1.

First, the constant voltage DC supply device 1 is operated, and power is supplied from one of the power storage units (the power storage unit 10a, for example) to the drive unit 30 (S1). Then, the drive unit 30 is driven, whereby the power generation units 40a and 40b generate power (S2), and a constant voltage direct current is supplied from the power generation unit 40b to an outside.

Then, the control unit 20 measures the voltage of the power storage unit being charged (the power storage unit 10b, for example) and determines whether the voltage of the power storage unit being charged is higher or lower than a predetermined second voltage V2 (S3). If the voltage of the power storage unit being charged is lower than the second voltage V2, the power storage unit (the power storage unit 10b, for example) is charged by using the power generated by the power generation unit 40a (S4). Here, if the voltage of the power storage unit being charged (the power storage unit 10b, for example) is at the second voltage V2 or more, the charging is stopped (S5). As a result, overcharging of the power storage unit can be prevented.

Here, the second voltage V2 is not particularly limited as long as the voltage can prevent the overcharging, and a voltage when electric energy of 1% or less is discharged with respect to the voltage when the power storage unit is fully charged, for example, is cited.

Subsequently, the control unit 20 measures the voltage of the discharging power storage unit (the power storage unit 10a, for example) and determines whether the voltage of the discharging power storage unit is higher or lower than a predetermined first voltage V1 (S6). And if the voltage of the discharging power storage unit is the first voltage V1 or more, the aforementioned Steps S1 to S5 are repeated.

Here, the first voltage V1 is not particularly limited but the voltage when the electric energy of 20% or less is discharged with respect to the voltage when the power storage unit is fully charged is preferable since charging can be performed easily, the voltage when electric energy of 10% or less is discharged with respect to the voltage when the power storage unit is fully charged is more preferable since charging can be performed more easily, and the voltage when the electric energy of 5% or less is discharged with respect to the voltage when the power storage unit is fully charged is particularly preferable since the charging can be performed particularly easily.

On the other hand, if the voltage of the discharging power storage unit is lower than the first voltage V1, the control unit 20 switches the discharging power storage unit and the power storage unit being charged (S7). That is, the control unit 20 executes control so as to allow the power to supply from the power storage unit having been charged (the power storage unit 10b, for example) to the drive unit, to supply the power generated by the power generation unit 40a to the power storage unit having supplied power (the power storage unit 10a, for example) so as to charge it.

Then, Steps S1 to S7 are repeated until the voltages of the both power storage units 10a and 10b fall below the first voltage V1 (S8) and when the voltage of the both power storage units 10a and 10b fall below the first voltage V1, the constant voltage DC supply device 1 is stopped, and the supply of the constant voltage current to the outside is stopped.

Figure 3:
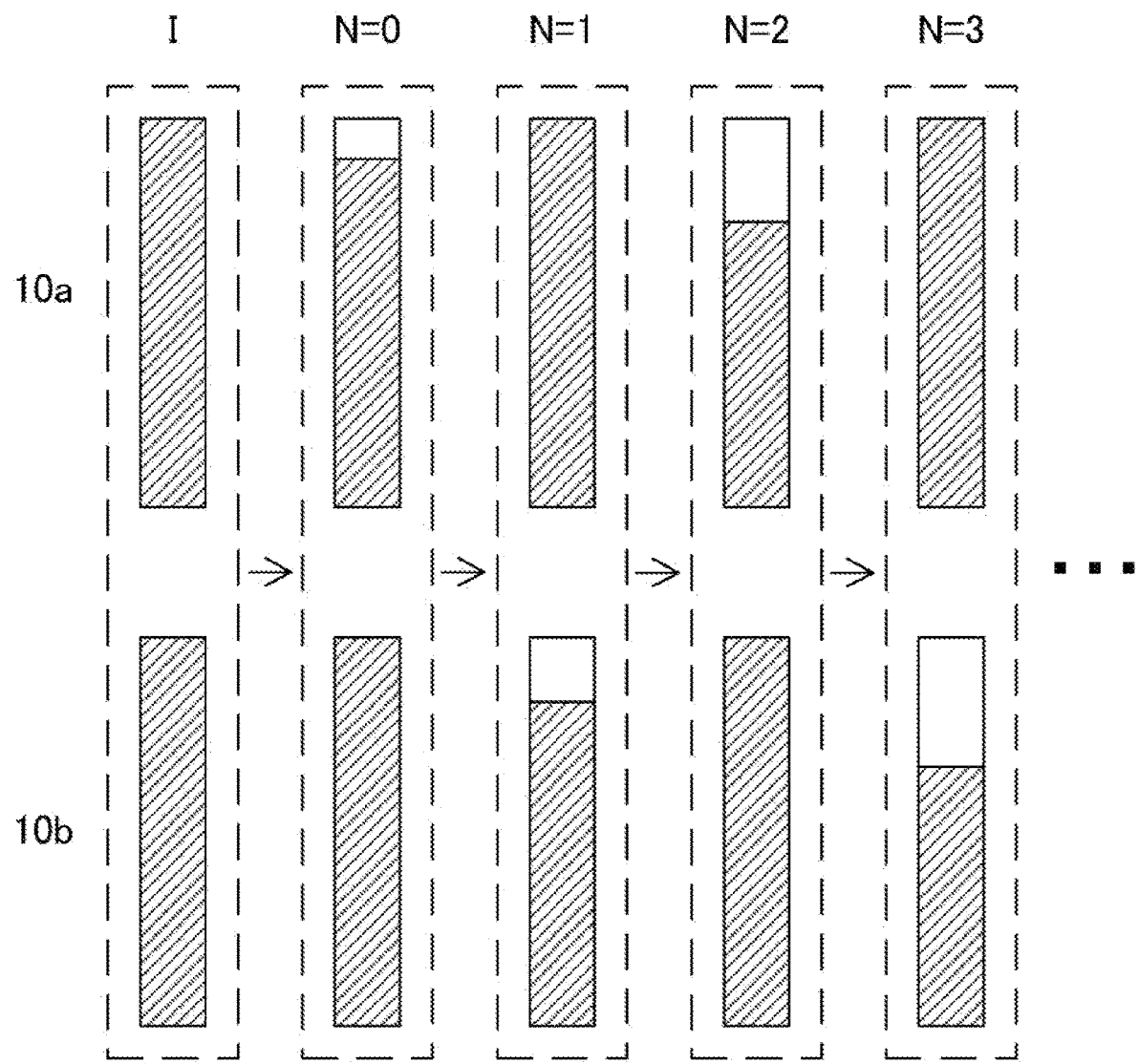
FIG. 3 is a schematic diagram illustrating electric energy stored in each of the power storage units in each replacement (switching) cycle by a control unit.

Moreover, the relationship between the operation of the control unit 20 and the electric energy stored in each of the power storage units 10a and 10b will be described. FIG. 3 is a schematic diagram illustrating the electric energy stored in each of the power storage units 10a and 10b in each switch (switching) cycle by the control unit. Here, a hatched portion indicates the charged electric energy.

As illustrated in this figure, in an initial state I, the electric energy stored in each of the power storage units 10a and 10b is the maximum amount. Then, when the power is supplied from the power storage unit 10a to the drive unit 30, the electric energy stored in the power storage unit 10a is decreased (N=0).

Then, when the voltage of the power storage unit 10a falls to the first voltage V1 or less, the power is supplied by the control unit 20 from the power storage unit 10b to the drive unit 30, and the power storage unit 10a is charged by the power generated by the power generation unit 40a. That is, the electric energy stored in the power storage unit 10b is decreased, and the electric energy stored in the power storage unit 10a is increased (N=1).

Subsequently, when the voltage of the power storage unit 10b falls to the first voltage V1 or less, the power is supplied by the control unit 20 from the power storage unit 10a to the drive unit 30, and the power storage unit 10b is charged by the power generated by the power generation unit 40a. That is, the electricity stored in the power storage unit 10a is decreased, and the electricity stored in the power storage unit 10b is increased (N=2).

Such operation is repeated until the electric energy stored in the power storage units 10a and 10b, respectively, falls to the predetermined electric energy (first voltage V1) or less.

Therefore, since the electric energy is supplied to the drive unit 30 from a state where the electric energy stored in each of the power storage units 10a and 10b, respectively, is the maximum value, the drive unit 30 can be driven without damping the driving force thereof. As a result, the current at the predetermined voltage can be supplied from the power generation unit 40b for a long time.

As described above, according to the constant voltage DC supply device 1 according to this embodiment, the direct current at the predetermined voltage can be efficiently supplied without depending on the characteristics of the power storage unit. As a result, since the current at the predetermined voltage can be supplied to the outside until the voltages of the both power storage units 10a and 10b fall below the first voltage V1, the power stored in the both power storage units can be efficiently converted to the current at the predetermined voltage.

Embodiment 2

Figure 4:
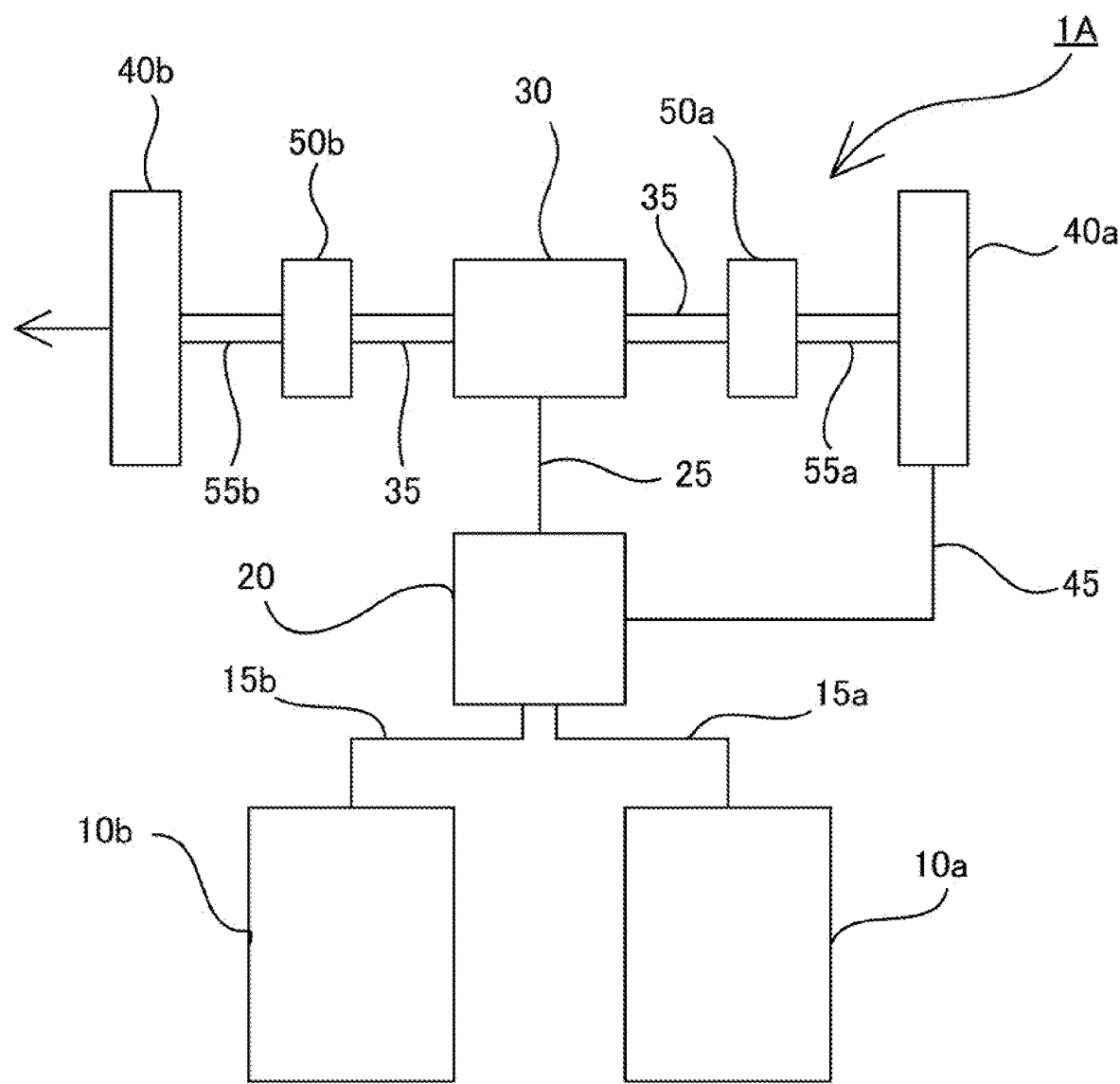
FIG. 4 is an outline configuration diagram of the constant voltage DC supply device according to a second embodiment 2.

In the embodiment 1, the drive unit and the power generation unit are directly connected through the shaft, but the present invention is not limited to that. As illustrated in FIG. 4, the drive unit 30 and the power generation units 40a and 40b may be connected, respectively, through converters 50a and 50b converting the driving force of the drive unit 30, respectively, for example.

More specifically, the converters 50a and 50b are mounted on both end portions of the shaft 35 connected to the drive unit 30. Subsequently, each of the converters 50a and 50b and each of the power generation units 40a and 40b are connected through shafts 55a and 55b transmitting the driving force converted by the converters, respectively.

Since the torque transmitted to the power generation units 40a and 40b can be adjusted by configuring the constant voltage DC supply device 1A as above, a setting range of the first voltage V1 can be made wider. As a result, the direct current at the predetermined voltage can be efficiently supplied without depending on the characteristics of the power storage units 10a and 10b. Moreover, since the current at the predetermined voltage can be supplied to the outside until the voltages of the both power storage units 10a and 10b fall below the first voltage V1, the power stored in the both power storage units 10a and 10b can be converted to the current at the predetermined voltage more efficiently.

OTHER EMBODIMENTS

In the aforementioned embodiment 1, the constant voltage DC supply device is configured using two power storage units, but the present invention is not limited to that. For example, the constant voltage DC supply device may be configured using three or more power storage units. In this case, there is no need to execute control so that the control unit stops charging if the voltage of the power storage unit being charged is at the second voltage V2 or more as in the constant voltage DC supply device of the embodiment 1, and the other power storage units other than the discharging power storage unit may be charged.

By configuring the constant voltage DC supply device as above, the power stored in the power storage unit can be efficiently converted to the current at the predetermined voltage, and the current at the predetermined voltage can be supplied from the power generation unit for a longer time.

Moreover, in the aforementioned embodiments, the constant voltage DC supply device is configured using two power generation units, but the present invention is not limited to that. The constant voltage DC supply device may be configured using three or more power generation units, for example. In this case, the power generated by the power generation unit other than the power generation unit supplying the power to the outside can be supplied to the power storage unit (including the same power storage unit) other than the power storage unit supplying the power to the drive unit. At this time, it may be so configured that the power generated by one power generation unit is supplied to a plurality of the power generation units.

Furthermore, in the aforementioned embodiments, the power generation unit generating power to be supplied to the power storage unit and the drive unit are not particularly limited, but it is preferable to configure such that the voltage of the power storage unit to be charged can be charged to the first voltage V1 or more before the voltage of the power storage unit supplying the power to the drive unit falls below the first voltage V1.

By the above-mentioned configuration, charging can be performed so that the voltage of the power storage unit being charged becomes the first voltage V1 or more before the voltage of the discharging power storage unit becomes smaller than the first voltage V1 and thus, the power stored in the power storage unit can be used more efficiently.

Note that, the aforementioned embodiments are configured such that the power storage unit supplying power and the power storage unit to be charged are changed at the same time when the voltage of the power storage unit falls to the first voltage V1 or less. However, since the voltage of the power storage unit and the electric energy emitted from the power storage unit are related to each other by using a calibration curve and the like, the "first voltage or less" in the present invention also includes a concept of the predetermined electric energy emitted.

REFERENCE NUMERALS 1, 1A constant voltage DC supply device
10a, 10b power storage unit
15a, 15b, 25, 45 wiring
20 control unit
30 drive unit
35, 55a, 55b shaft
40a, 40b power generation unit
50a, 50b converter

The invention claimed is:

1. A constant voltage DC supply device for supplying a direct current at a predetermined voltage from a specific power generation unit, comprising:
a plurality of power storage units;
a drive unit connected to the plurality of power storage units and rotating/driving by power supplied from any one of the power storage units;
a plurality of the power generation units connected to the drive units, respectively, and generating power by driving of the drive units; and
a control unit for controlling connection between the plurality of power storage units and the driving unit and between the power generation units other than the specific power generation unit and the power storage units, wherein
the control unit executes control such that, when a voltage of one power storage unit supplying the power to the drive unit falls to a first voltage or less, the power is supplied from the power storage unit other than the one power storage unit and that at least one power storage unit other than the one power storage unit is charged.

2. The constant voltage DC supply device according to claim 1, wherein the constant voltage DC supply device is composed of the drive unit and the power generation unit, capable of charging such that a voltage of the power storage unit to be charged becomes the first voltage or more before the voltage of the power storage unit supplying the power to the drive unit falls below the first voltage.

3. The constant voltage DC supply device according to claim 1, wherein at least one of the power generation units is connected to the drive unit through a converter which converts a torque of the drive unit.

4. The constant voltage DC supply device according to any one of claim 1, wherein the control unit executes control such that, when the voltage of one power storage unit being charged becomes a second voltage higher than the first voltage or more, the power storage unit other than the one power storage unit and other than the power storage unit supplying the power is charged or charging to the one power storage unit is stopped.

5. The constant voltage DC supply device according to any one of claim 1, wherein at least a part of the power storage unit is covered with a heat insulating material.

6. The constant voltage DC supply device according to any one of claim 1, wherein the predetermined voltage is 40 V or more.

7. The constant voltage DC supply device according to claim 2, wherein the control unit executes control such that, when the voltage of one power storage unit being charged becomes a second voltage higher than the first voltage or more, the power storage unit other than the one power storage unit and other than the power storage unit supplying the power is charged or charging to the one power storage unit is stopped.

* * * * *

UNITED STATES PATENT AND TRADEMARK OFFICE
CERTIFICATE OF CORRECTION

PATENT NO. : 11,693,442 B2  
APPLICATION NO. : 16/979142  
DATED : July 4, 2023  
INVENTOR(S) : Takashi Kamezawa, Akihiko Tanaka and Masaki Sakaguchi Page 1 of 1

It is certified that error appears in the above-identified patent and that said Letters Patent is hereby corrected as shown below:

On the Title Page

Item (71) Applicants:
Insert --Takashi KAMEZAWA, Saitama (JP)--.

Signed and Sealed this  
Twenty-second Day of August, 2023

Katherine Kelly Vidal  
*Director of the United States Patent and Trademark Office*